April 25, 1961
LIAN-TONG WEN
2,981,627
METHOD OF TREATING COCONUT JUICE
Filed Feb. 24, 1959
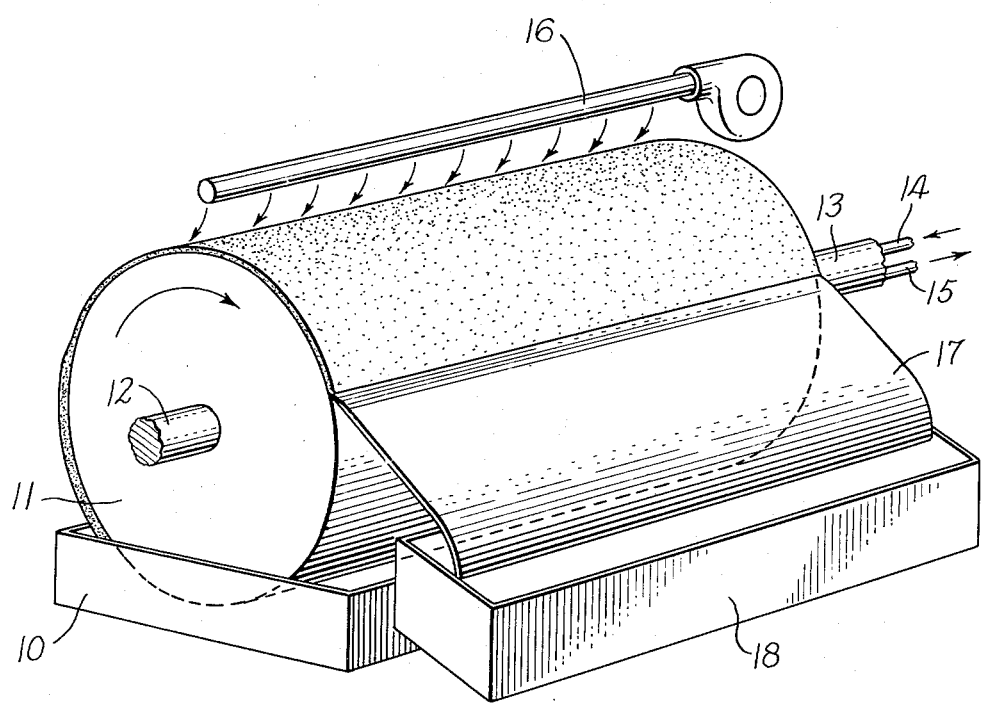
INVENTOR
Lian-Tong Wen
BY
J.P. Basseches
his ATTORNEY 2,981,627

METHOD OF TREATING COCONUT JUICE

Lian-Tong Wen, 601 W. 112th St., New York, N.Y.

Filed Feb. 24, 1959, Ser. No. 795,289

8 Claims. (Cl. 99—125)

This invention relates to a coconut milk product and more particularly to the preparation of a coconut juice in concentrated form which preserves all of the desirable qualities of taste and bouquet of the fresh coconut, presenting it, however, in a solid, homogenized condition resembling the consistency of a chocolate bar, but retaining its initial milk-like whiteness, and which is susceptible of refrigeration without evidencing the formation of crystalline structure.

My invention is predicated upon the discovery that when the aqueous coconut juice is isolated from the fresh meat and the resultant coconut milk is concentrated to retain the fatty globules in the discontinuous phase, with its inherent or natural component or quantity of water to retain the protective colloidal agent effective, a highly desirable concentrate is achieved, retaining a high degree of the desirable properties of the fresh coconut as to flavor and bouquet.

In accordance with my invention, therefore, fresh coconut meat (cocos nucifera Palmaceae) is finely ground, crushed, or shredded to press out and isolate the major portion of the aqueous juice. Remnants of the desirable juice may be recovered from the fibrous solids by incorporating additional quantities of water to the pulp, and regrinding and kneading to entrain the fat carrying juice from the fibre into the water, in grinding or crushing, care being taken to prevent coalescence of the fatty material. The isolated juice as originally pressed out or secured by washing or wet kneading is then filtered free from the fibre. The filtrates may be called the milk. Thereupon the milk is treated by one of several methods to further isolate the lighter fraction carrying the juice and fats from the primary aqueous material in the continuous phase, within limits retaining a critical condition of the cream so that the fatty oil in the dispersed phase is substantially unaltered, so that the fatty particles are maintained in the dispersed phase. The separation of the fatty components from the aqueous layer is to retain with the fatty particles in the dispersed phase about 35% of water. While a range of from 30 to 35% is preferred, the water content may be as low as 25% but no higher than 40%. In observing the condition and quantity of the aqueous medium retained in the continuous phase, it should be noted that it should be an amount of water in the aqueous phase, such that there is not too much nor so dilute a condition of the solids in the continuous phase so as to form water or icy crystals when refrigerated to temperatures below the freezing point of water and not so little water as to destroy the protective colloid and to allow the fat globules to coalesce. Variations in the amount of percentages of water accompanying fatty particles in the discontinuous phase may be involved due to the richness of the coconut meat and its condition as to age or freshness. Accordingly in the claims, a natural component of about 35% of water, is intended to cover a limit of the dispersed aqueous phase and protective colloid with and for the fatty globules in which crystallization is prevented when the product is frozen and a lower limit at which a change in the condition of the fat globules is noted tending to cause coalescence of the oil when the product is frozen and then thawed. It is to be observed that when the product contains above 40% of water, the excess water will crystallize when the product is stored in a refrigerator below the freezing point and that 25% minimum of water should not be reached lest part of the cream will coalesce into oil, when melting the cream for use.

Copra may be used and ground with water to extract the fatty components as a dispersion, without heat which would coalesce the fatty particles and cause a change in phase.

One method of isolation for the separation of the cream layer and aqueous layer is effected by the settling method, in which case the juice is permitted to stand to permit the water to form the lower layer and the fatty material the upper layer and form a cream-like layer. The cream layer is decanted and separated from the heavier layer. The cream layer may contain more water than is needed, in which event this cream is chilled to a temperature below 21° C. and above 0° C. to allow the suspended cream to solidify and to thereupon permit the cream to settle again to effect a further and more complete separation of the fatty globules from the water in the continuous phase. This latter chilling step enables the cream to retain its natural amount of water to prevent a change in phase of the fatty component and to form a compound which will solidify within a range above the freezing point of water and below 21° C. It is preferred, however, that the cooling temperature be maintained between about 14 and 2° C.

A second method is to treat the juice immediately after filtration therefrom of the fibre, to a centrifuging process. Room temperatures may be employed to separate a cream, maintaining a temperature desirably between 21° C. and 0° C. At this temperature, the suspended particles cooperate to form a solid mass (it will not flow like liquid when dried); therefore the process is a force filtration. The product thus obtained is ready for molding and packaging.

The chilled cream obtained by either of the foregoing methods at temperatures below 21° C. and between and above 0° C., may be likened in its properties as to consistency to chocolate at room temperatures and may be packaged by cutting or extruding into such forms in which butter is usually handled without requiring watertight containers normally employed in handling liquids. The product may be simply packed in wrapping material such as paper, cellophane, waxed sheets, or the like, which sheeting may be employed to wrap blocks of the solidified concentrate.

The cream as prepared above, may be thawed out by warming up above 21° C. into a heavy creamy state, to be reworked into some other shape if such procedure is found desirable.

Where the water content in the continuous phase is satisfactorily removed and the natural water content has been retained at the said critical limit for the retention of the protective colloid, fast freezing methods (i.e. sub-freezing) may be employed to preserve the product against deterioration, without experiencing any alteration in the consistency of the solid product upon thawing, for use at room temperatures.

The product as obtained by me preserves the cream in solid form, with all of the natural flavor, for use as a shortening or as a condiment for flavoring confections or similar food products.

It is to be noted that in the practice of my invention I prefer to use the fresh coconut meat before any decomposition has taken place. The coconuts need not be fully matured but should be those which have been freshly opened.

It will also be understood that while centrifuging to separate the water content of the continuous phase, as above described, may be effected at room temperatures, both this procedure of concentration as well as that by settling out the lighter and heavier fractions are best effected at a temperature below 21° C.

The solid coconut cream in accordance with my procedure, may be preserved for extended periods by deep freeze methods, without deleterious effect upon thawing of the cream. However, it is desirable to add compounds to prevent rancidity or the formation of mold by such agents as mycoban mold or rope inhibitor or tenox, or the like, when long periods of preservation are deemed desirable and storage is effected in packages employing paper or like sheeting. In this form, no deterioration occurs and no separation is evidenced, and crystallization of the aqueous medium is not perceptible.

While I have described and illustrated the centrifuging method and the settling method for the isolation of the fatty constituents in dispersed form or as an aqueous emulsion from the continuous phase aqueous medium, I may employ the isolation of such desirable component as hereinbefore indicated by a process as follows:

The fresh juice as originally pressed out and secured by washing and/or wet kneading of the fresh white meat or restored copra, hereinbefore referred to as the milk, is cooled to a temperature of about 22 to 25° C. Into this liquid there is dipped a cylindrical drum which has provision for chilling the peripheral surface thereof to a temperature of from 1 to 5° C., provision being made for circulating such chilling fluid through the trunnion for supporting the cylindrical drum during its rotation, which dips a small peripheral portion of the drum into the milk, cooled as previously described. The cylindrical drum on its exposed surface not dipping into the milk is exposed to rapidly circulating dry air, which blows off and evaporates the aqueous medium from the milk, as it is spread as a thin film on the drum. The trailing edge of the rotating drum is contacted with a scraper blade to scrape the isolated and concentrated fatty components accumulating on the periphery of the drum into a collecting container. The isolated fatty components may thereupon be chilled to below the freezing point, to provide a product which may be thawed without evidencing coalescence.

In the appended drawing, the device described is illustrated wherein 10 is a container into which the coconut milk is maintained at a predetermined level. Into this liquid the cylindrical drum 11 dips for a small portion thereof. The drum is supported on trunnions 12 and 13, maintaining the drum in the predetermined described depth. Inlet pipe 13 and outlet pipe 15 serve to circulate a chilling agent to the interior of the drum, to maintain the temperature of the periphery of the drum at from 1 to 5° C. Above the exposed surface of the drum there is a blower 16, with provision for supplying a drift of dry air in counter-current relation to the rotation of the drum to maintain an evaporative and clearing influence on the film of liquid. Adjacent the trailing edge of the drum is a scraper blade 17, leading to a collector container 18, which may be provided with refrigerating means, with temperatures below 0° C. to thus cause the scraping off of solids from the drum.

Thus, in accordance with my disclosure, I resort to the observation that the fatty materials contained in the milk are solids at temperatures below 21° C., and therefore may be isolated from the aqueous suspensoid by gravitation or forced filtration, i.e. centrifuging equipment or filter presses or cold separation, thereby to secure the isolation of the fatty component in the form of a cream at normal room temperatures. Thus, the methods may be as follows:

(1) Settling method—
 (a) At room temperatures at which a liquid cream is obtained;
 (b) At from 21 to 1° C., at which temperature a solidified cream is obtained.

(2) Centrifuging method—
 (a) At room temperatures, in which the normal cream separator processes are resorted to;
 (b) At temperatures between 21 to 1° C., in which the fatty components are separated by forced filtration into a solid form.

(3) Cold drum method wherein the aqueous medium is blown off and evaporated while solidifying the fatty components.

(4) Filtration at a temperature from 21 to 1° C.—
 (a) Through screens;
 (b) By the use of filter presses.

(5) The combined methods may likewise be employed wherein—
 (a) The milk is first centrifuged and then exposed to concentration on the cold drum and then the solidified material collected;
 (b) Settling to separate a portion of the aqueous suspensoid and then completing to the desired degree by centrifuging;
 (c) Settling to partially isolate the fatty component and then employing the cold drum method to separate the chilled cream;
 (d) Isolating by settling followed by filtration in the cold to remove the suspensoid;
 (e) Partial separation by centrifuging and completing to the desired degree by the cold drum evaporating system described;
 (f) Partial separation by centrifuging and forced filtration through screens, such as filter presses.

The resultant product, in each case, when chilled below 21° C. may be preserved in block form.

While preservation in block form may be secured in accordance with the foregoing method of making the solid cream, it is contemplated by me to make a pulverulent product.

To provide a milk powder-like product, the cream obtained by either of the foregoing methods is warmed up to above 21° C., to reach a creamy condition at as low a temperature as possible, whereupon it is sprayed into a cold atmosphere, maintained at a temperature at least below 0° C. The particles solidify to to a dry product which may be handled as a powder at or below 21° C., without clumping. The powder may be reconstituted into a creamy or milk-like product or may be blended readily with liquids and solids in the manner in which milk powder is employed.

While I have described the production of a milk powder-like product from the cream by spraying the creamy product into a refrigerated chamber maintained at a temperature at least below 0° C., I may form a powdered or granulated material by refrigerating the cream well below 0° C. At that temperature, the cream is hard and brittle and may be crushed or pulverized to the powdery or granulated form. This powdered or pulverulent material may be reconstituted at higher temperatures, particularly above 21° C., by the addition of water or reduced to a creamy consistency by warming up to and above said temperature. If hot water is used, it should be added by stirring.

In the specification and claims, I intend to include by the term "coconut juice" the milk-like emulsion and residual liquid, free from fibrous solids obtained from the "white meat" of the coconut and separated from said fibrous solids and composed of coconut oil, the sugar and albuminous and other proteinous components in emulsified condition, with oil remaining in the dispersed phase.

By "gravitational separation" as used in the claims herein, I mean to include the methods herein described as by settling, centrifuging, filtration or combinations thereof as described to isolate the fatty component from the aqueous suspensoid, as distinguished from a procedure involving chemical flocculation or physical coalescence, where a change in phase of the fatty oil and suspensoid may take place.

This application is a continuation-in-part of my application Serial No. 323,959, filed December 4, 1952, which in turn is a continuation-in-part of my application Serial No. 237,474, filed July 18, 1951, entitled "Coconut Cream and Method of Preparing the Same," now abandoned.

Having thus described my invention and illustrated its use, what I claim as new and desire to secure by Letters Patent is:

1. The method of treating coconut juice to prepare a spreadable and reconstitutable emulsified product which includes the steps of isolating the fatty components of the juice of the fresh coconut by gravitational separation of the aqueous medium, to retain the fatty components in the dispersed phase in a quantity of the aqueous medium entrained thereby as a natural component, and chilling to below 21° C. and above 0° C.

2. A method in accordance with claim 1 wherein the gravitational separation is effected by settling, followed by decanting the fatty layer at the temperatures noted.

3. The method in accordance with claim 1 wherein the chilling is effected at a temperature no higher than 14° C. and no lower than 2° C.

4. The method of treating coconut juice to prepare a spreadable, water reconstitutable emulsified product which includes the step of isolating the fatty components of the fresh juice without fatty coalescence by gravitational separation while retaining the fatty components in the dispersed phase to have an aqueous content of about 30 to 35%, under temperature conditions no higher than 14° C. and not below 2° C., and then packaging a formed bulk of said material before freezing to sub-zero temperatures.

5. The method of treating coconut juice to prepare a spreadable and water reconstitutable emulsified product which includes the steps of isolating the fatty component of the fresh juice in an aqueous medium without fatty coalescence and then settling the juice at temperatures between 21° C. and 0°C., without the formation of water ice, decanting the lighter layer having about 35% of an aqueous component and then shaping the resulting fatty layer.

6. The method of treating coconut juice to prepare a spreadable, water reconstitutable emulsified product which includes the steps of gravitationally concentrating the fresh juice to about an aqueous content of not below 25% and not more than 40% without a change in phase of the fatty component, solidifying the cream thus formed at a temperature not above 14° C. and no lower than 2° C.

7. The method of treating coconut juice to prepare a spreadable, emulsified product which includes the steps of isolating the fatty component of the fresh juice of the coconut in an aqueous suspensoid and by gravitational separation reducing the aqueous content to about 30 to 35% while retaining the fatty components in the dispersed phase, and then spraying the concentrate into a refrigerated chamber maintained at a temperature at least below 0° C., to form a powdered, granulated material, the granular condition being retained to and including 21° C. without clumping.

8. The method of treating coconut juice to provide a powdered or granulated product which includes the steps of isolating the fatty component of the fresh juice in an aqueous suspensoid and by gravitational separation reducing the natural content to about 35% while chilling to below 21° C. and just above 0° C., retaining the fatty components in the dispersed phase, freezing to subfreezing temperatures to solidify the concentrate, grinding and pulverizing the concentrate in this form, the product being reconstitutable by thawing to and above 21° C.

References Cited in the file of this patent
UNITED STATES PATENTS

| | | |
|---|---|---|
| 1,366,339 | Alexander | Jan. 25, 1921 |
| 1,374,879 | Cookson | Apr. 12, 1921 |
| 2,293,848 | Rector | Aug. 25, 1942 |